United States Patent
Miyasaka et al.

(10) Patent No.: US 10,381,966 B2
(45) Date of Patent: Aug. 13, 2019

(54) PN-BUSBAR COMMON SYSTEM, REGENERATIVE CONTROL DEVICE, AND REGENERATIVE CONTROL METHOD

(71) Applicant: Mitsubishi Electric Corporation, Tokyo (JP)

(72) Inventors: Takashi Miyasaka, Tokyo (JP); Yasuhiro Endo, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/551,680

(22) PCT Filed: Apr. 22, 2016

(86) PCT No.: PCT/JP2016/062833
§ 371 (c)(1),
(2) Date: Aug. 17, 2017

(87) PCT Pub. No.: WO2017/183200
PCT Pub. Date: Oct. 26, 2017

(65) Prior Publication Data
US 2018/0138851 A1 May 17, 2018

(51) Int. Cl.
*B60L 7/18* (2006.01)
*B60L 58/20* (2019.01)
(Continued)

(52) U.S. Cl.
CPC ............ *H02P 27/06* (2013.01); *B60K 1/02* (2013.01); *G05B 15/02* (2013.01); *H02P 3/18* (2013.01); *H02P 5/46* (2013.01); *H02P 5/51* (2016.02)

(58) Field of Classification Search
USPC ............................ 318/53, 434, 376; 320/103
See application file for complete search history.

(56) References Cited

U.S. PATENT DOCUMENTS

2014/0184129 A1  7/2014  Oka et al.
2016/0020721 A1*  1/2016  Ueda .................. H02P 3/22
                                              318/400.04

FOREIGN PATENT DOCUMENTS

CN      105229918 A    1/2016
JP      11-089285 A    3/1999
(Continued)

OTHER PUBLICATIONS

International Search Report for PCT/JP2016/062833 dated Jul. 26, 2016.

*Primary Examiner* — Eduardo Colon Santana
*Assistant Examiner* — Charles S Laughlin
(74) *Attorney, Agent, or Firm* — Sughrue Mion, PLLC; Richard C. Turner (57) ABSTRACT

A PN-busbar common system includes motor drive devices for a plurality of motors, each of which is supplied with power from a common PN-busbar, where the motor drive devices individually drive the corresponding motors. Each of the motor drive devices executes a regenerative control on a basis of a regenerative-control start voltage, and controls to stop the regenerative control on a basis of a regenerative-control stop voltage, and also individually calculates a regenerative load ratio to control to enable or disable the regenerative control on a basis of a result of a comparison between a calculated regenerative load ratio and a set regeneration-capable load ratio.

3 Claims, 6 Drawing Sheets

(51) Int. Cl.
*H02P 27/06* (2006.01)
*H02P 5/51* (2016.01)
*B60K 1/02* (2006.01)
*H02P 3/18* (2006.01)
*G05B 15/02* (2006.01)
*H02P 5/46* (2006.01)

(56) References Cited

FOREIGN PATENT DOCUMENTS

| | | | |
|---|---|---|---|
| JP | 2005-253213 A | | 9/2005 |
| JP | 2007-174729 A | | 7/2007 |
| JP | 2010-110139 A | | 5/2010 |
| JP | 2012-175871 A | | 9/2012 |
| JP | 2012175871 A | * | 9/2012 |
| JP | 2014-128172 A | | 7/2014 |

* cited by examiner

PN-BUSBAR COMMON SYSTEM, REGENERATIVE CONTROL DEVICE, AND REGENERATIVE CONTROL METHOD

CROSS REFERENCE TO RELATED APPLICATIONS

This application is a National Stage of International Application No. PCT/JP2016/062833 filed Apr. 22, 2016, the contents of all of which are incorporated herein by reference in their entirety.

FIELD

The present invention relates to a PN-busbar common system that includes a plurality of motor drive devices connected in common to a positive DC busbar, referred to as a "P-busbar", and a negative DC busbar, referred to as an "N-busbar" (hereinafter, both of them are collectively referred to as a "PN-busbar"). The present invention also relates to a regenerative control device connected to the PN-busbar common system, and a regenerative control method for the regenerative control device.

BACKGROUND

Generally, in each of the motor drive devices that constitute a PN-busbar common system, a regenerative control device is provided to absorb the regenerative-power energy in a motor connected to each motor drive device. It is a common configuration that the regenerative-power energy is consumed by a regenerative resistor. In the following descriptions, the control designed to cause a regenerative resistor to consume the regenerative-power energy is referred to as "regenerative control".

The regenerative control in the PN-busbar common system is required to prevent a regenerative function from being faulty due to a difference in rated regenerative power between the regenerative control devices. Therefore, it is common to operate the motor drive devices in such a manner as to enable the regenerative function of only one of the motor drive devices, which has the maximum regenerative power in the system. Therefore, there are one or more motor drive devices that have a regenerative function, although do not actually use it. Meanwhile, in the operating method as described above, the amount of power that can be regenerated is limited. Accordingly, this may not meet the maximum required regenerative power for the PN-busbar common system.

In the PN-busbar common system, it suffices that a plurality of regenerative functions that are present within the system are used in order to increase the amount of power that can be regenerated. However, in the conventional method using a plurality of regenerative functions, the PN-busbar common system is configured by only the motor drive devices having the same regenerative power, or a system that controls a regenerative load on each motor drive device is added to the PN-busbar common system, so as to operate the motor drive devices while preventing a fault in the regenerative functions. In contrast, in a case where these methods cannot be applied to the PN-busbar common system, a countermeasure is needed, such as a reduction in the load on the regenerative function by means of adding an external option dedicated to the regenerative function which has a sufficient regenerative capability, or by means of modifying the operational pattern of the motor in such a manner as to minimize the increase in bus voltage attributable to the regenerative control.

Under the technical background as described above, Patent Literature 1 listed below describes a method, in which a motor drive device having a master controller and a master function manages the regenerative capability to control the regenerative load ratio of each motor drive device within the PN-busbar common system, thereby efficiently executing the regenerative control in each motor drive device, while preventing a fault in the regenerative function due to an excess of the allowable amount of regenerative power.

Patent Literature 2 listed below describes a multiaxial motor control device. Instead of the motor drive device having a master controller and a master function, the multiaxial motor drive device executes a regenerative control in each of the motor drive devices through a network connecting the motor drive devices with each other, and therefore can prevent a fault in the regenerative function due to an overload.

CITATION LIST

Patent Literatures

Patent Literature 1: Japanese Patent Application Laid-open No. H11-89285
Patent Literature 2: Japanese Patent Application Laid-open No. 2014-128172

SUMMARY

Technical Problem

However, in the method described in Patent Literature 1 listed above, in addition to the controller that controls the motors, a more advanced motor drive device is needed, which has a master controller or a master function for managing the regenerative capability. Therefore, there is a problem in that the system configuration becomes oversized.

Further, in the method described in Patent Literature 2, the network wiring is needed. This results in a problem that the wiring between the devices is more complicated than the conventional method. Furthermore, the regenerative control needs to be executed on the individual motor drive devices either simultaneously or in turn. This results in a problem that a considerable amount of cost is required to construct network management firmware that executes the regenerative control.

The present invention has been achieved in view of the above problems, and an object of the present invention is to provide a PN-busbar common system that does not need to construct network management firmware that executes a regenerative control, and that can prevent a system configuration from being oversized.

Solution to Problem

In order to solve the above problems, and to achieve the object, according to an aspect of the present invention, there is provided a PN-busbar common system comprising a plurality of motor drive devices that are provided correspondingly to a plurality of motors, each of which is supplied with power from a common PN-busbar, where the motor drive devices individually drive the corresponding motors, wherein each of the motor drive devices controls to execute a regenerative control on the basis of a regenerative-control start voltage, and to stop the regenerative control on the basis of a regenerative-control stop voltage, and also individually calculates a regenerative load ratio to control to enable or disable the regenerative control on the basis of a result of a comparison between a calculated regenerative load ratio and a set regeneration-capable load ratio.

Advantageous Effects of Invention

According to the present invention, an effect is obtained where it is possible to need no construction of network management firmware that executes a regenerative control, and to prevent a system configuration from being oversized.

DESCRIPTION OF EMBODIMENTS

A PN-busbar common system, a regenerative control device, and a regenerative control method according to an embodiment of the present invention will be described in detail below with reference to the accompanying drawings. The present invention is not limited to the embodiment.

Embodiment

Figure 1:
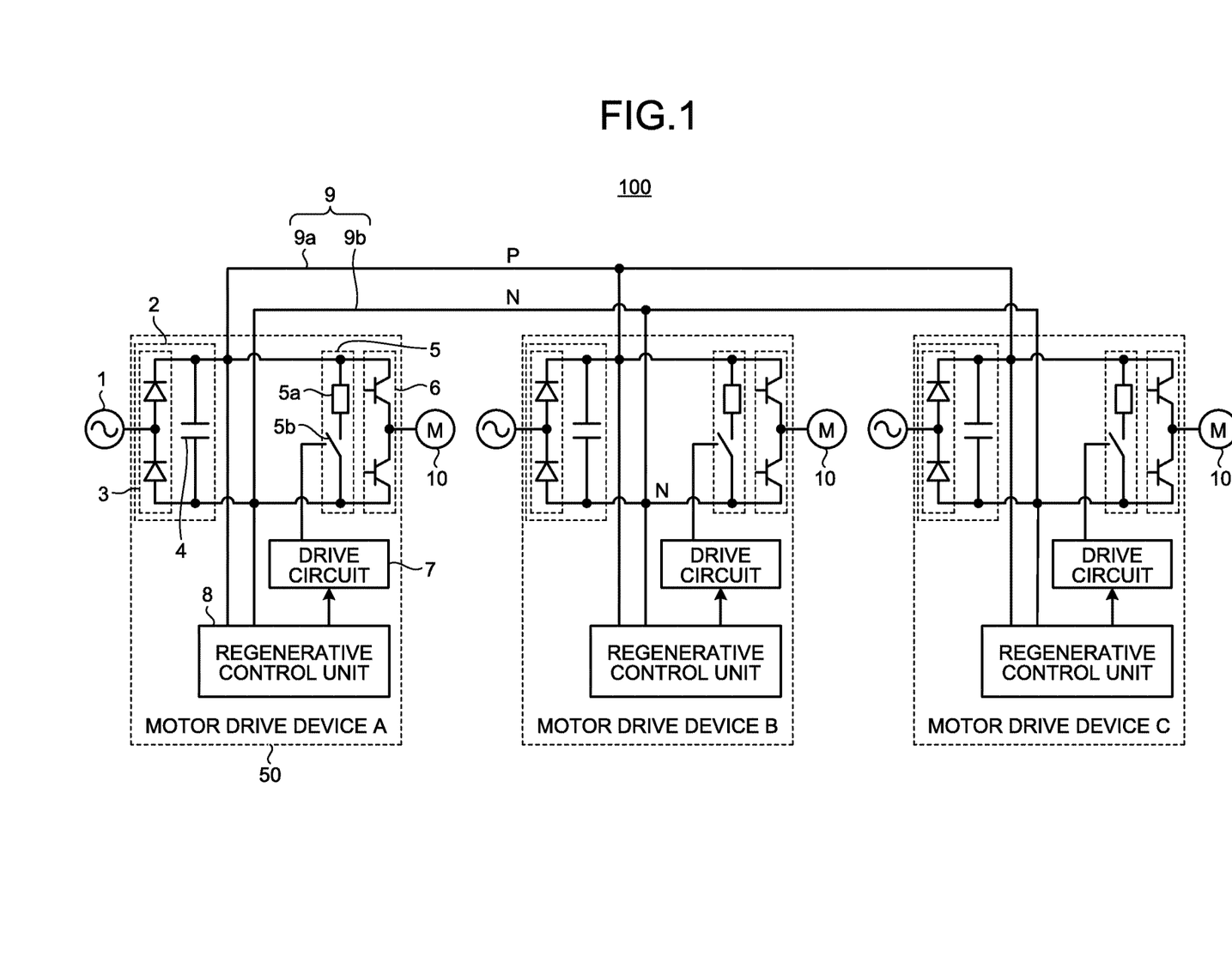
FIG. 1 is a block diagram illustrating a configuration of a PN-busbar common system according to an embodiment.

FIG. 1 is a block diagram illustrating a configuration of a PN-busbar common system 100 according to an embodiment of the present invention. As illustrated in FIG. 1, in the PN-busbar common system 100, a P-busbar 9a that is a positive DC busbar, and an N-busbar 9b that is a negative DC busbar, are defined as a common DC busbar, that is, a PN-busbar 9. The PN-busbar common system 100 is configured to include a plurality of motor drive devices 50 connected to the PN-busbar 9. An AC power supply 1 is connected to an input terminal of the motor drive device 50. A motor 10 that is a load is connected to an output terminal of the motor drive device 50. In the PN-busbar common system 100 configured as described above, a plurality of motor drive devices 50 are provided correspondingly to a plurality of motors 10, each of which is supplied with power from the PN-busbar 9. These motor drive devices 50 individually drive the corresponding motors 10. FIG. 1 illustrates a case in which the PN-busbar common system 100 includes three motor drive devices 50 as an example. These three motor drive devices are distinguished from each other with an "A", "B", or "C" designation added after the name and its reference numeral. As an example of the PN-busbar common system 100, a motor drive system that includes a drive system constituted of a plurality of servo axes is illustrated.

Next, the configuration of the motor drive device 50 is described. Three motor drive devices have a configuration that is the same as or equivalent to each other. Therefore, the configuration of the motor drive devices is described with reference to a motor drive device 50A.

The motor drive device 50A includes a converter circuit 2 that converts a DC voltage to an AC voltage, an inverter circuit 6 that converts DC power supplied from the converter circuit 2 to AC power, a regenerative-power consumption circuit 5 that consumes regenerative power generated by the motor 10, a drive circuit 7 that drives a switch 5b of the regenerative-power consumption circuit 5, and a regenerative control unit 8 that executes a regenerative control through the drive circuit 7.

The converter circuit 2 includes a diode stack 3 and a main circuit capacitor 4. The diode stack 3 converts an AC voltage applied from the AC power supply 1 to a DC voltage. The positive output terminal of the diode stack 3 is electrically connected to the P-busbar 9a. The negative output terminal of the diode stack 3 is electrically connected to the N-busbar 9b. The main circuit capacitor 4 is electrically connected between the P-busbar 9a and the N-busbar 9b, and smooths the voltage output from the diode stack 3. Owing to this configuration, the voltage across the main circuit capacitor 4 causes a bus voltage to be generated between the P-busbar 9a and the N-busbar 9b.

In the inverter circuit 6, upper-arm and lower-arm switching elements are connected between the P-busbar 9a and the N-busbar 9b. The inverter circuit 6 converts the bus voltage to an AC voltage with an arbitrary magnitude and frequency, and applies the AC voltage to the motor 10.

The motor 10 performs a power running operation or a regenerative operation. When the motor 10 performs a regenerative operation, it operates as a generator. Power generated through the power generating operation by the motor 10 is regenerative power. The regenerative power in the motor 10 is used to charge the main circuit capacitor 4 through the inverter circuit 6. Therefore, when the motor 10 performs a regenerative operation, the bus voltage is increased.

The regenerative-power consumption circuit 5 includes a regenerative resistor 5a and the switch 5b which are connected in series between the P-busbar 9a and the N-busbar 9b. When the switch 5b is closed, the regenerative resistor 5a is electrically connected between the P-busbar 9a and the N-busbar 9b. Therefore, a current flows through the regenerative resistor 5a. The regenerative power from the motor 10 is consumed by the regenerative resistor 5a.

The case has been described above, in which the motor drive device 50 operates independently. Next, the operation of the PN-busbar common system 100 is described. Although not illustrated in FIG. 1, in the general configuration of the PN-busbar common system, an instruction device that instructs an operational pattern of the motor is provided on the upstream of the system. Additionally, the system has a communication function of notifying the positional information of the motor 10, which is located between the motor 10 and the motor drive device 50.

In the PN-busbar common system 100, a motor 10A is assumed to be in a regenerative state, while motors 10B and 10C are assumed to be in a power running state. In this state, if the regenerative power in the motor 10A is lower than the power running power in the motors 10B and 10C, the regenerative power is consumed as the power running power, and thus the bus voltage is not increased. Meanwhile, in a case where the motors 10A, 10B, and 10C are all in a regenerative state, or the total regenerative power of any of the motors 10A, 10B, and 10C, which is in a regenerative state, is greater than the power running power of any of the motors 10A, 10B, and 10C, which is in a power running state, then this total regenerative power cannot be used up as the power running power. Therefore, the bus voltage is increased. Accordingly, the PN-busbar common system 100 of the present embodiment executes a regenerative control illustrated in FIG. 2 and FIG. 4.

The terms used in the following descriptions are defined as below.

Allowable regenerative power: the maximum power that can be consumed by a regenerative-power consumption circuit in each motor drive device Regenerative load ratio: a ratio of regenerative power to the allowable regenerative power Regenerative-control start voltage: a bus voltage at which a regenerative control is started Regenerative-control stop voltage: a bus voltage at which a regenerative control is stopped Regeneration-capable load ratio: a determination value used to determine whether the regenerative load ratio is safe for restarting the regenerative control Maximum allowable load ratio: a determination value used to determine whether the regenerative load ratio has reached an allowable regenerative capability in each motor drive device The value of the regeneration-capable load ratio, and the value of the maximum allowable load ratio, are set individually for each motor drive device. Any value can be set arbitrarily in accordance with the implementation of a desired type of regenerative control. That is, both the regeneration-capable load ratio and the maximum allowable load ratio can be set to have a predetermined threshold. Further, the value of the regenerative-control start voltage, and the value of the regenerative-control stop voltage, are individually set for each motor drive device. An identical value is not necessarily set for all the motor drive devices.

Figure 2:
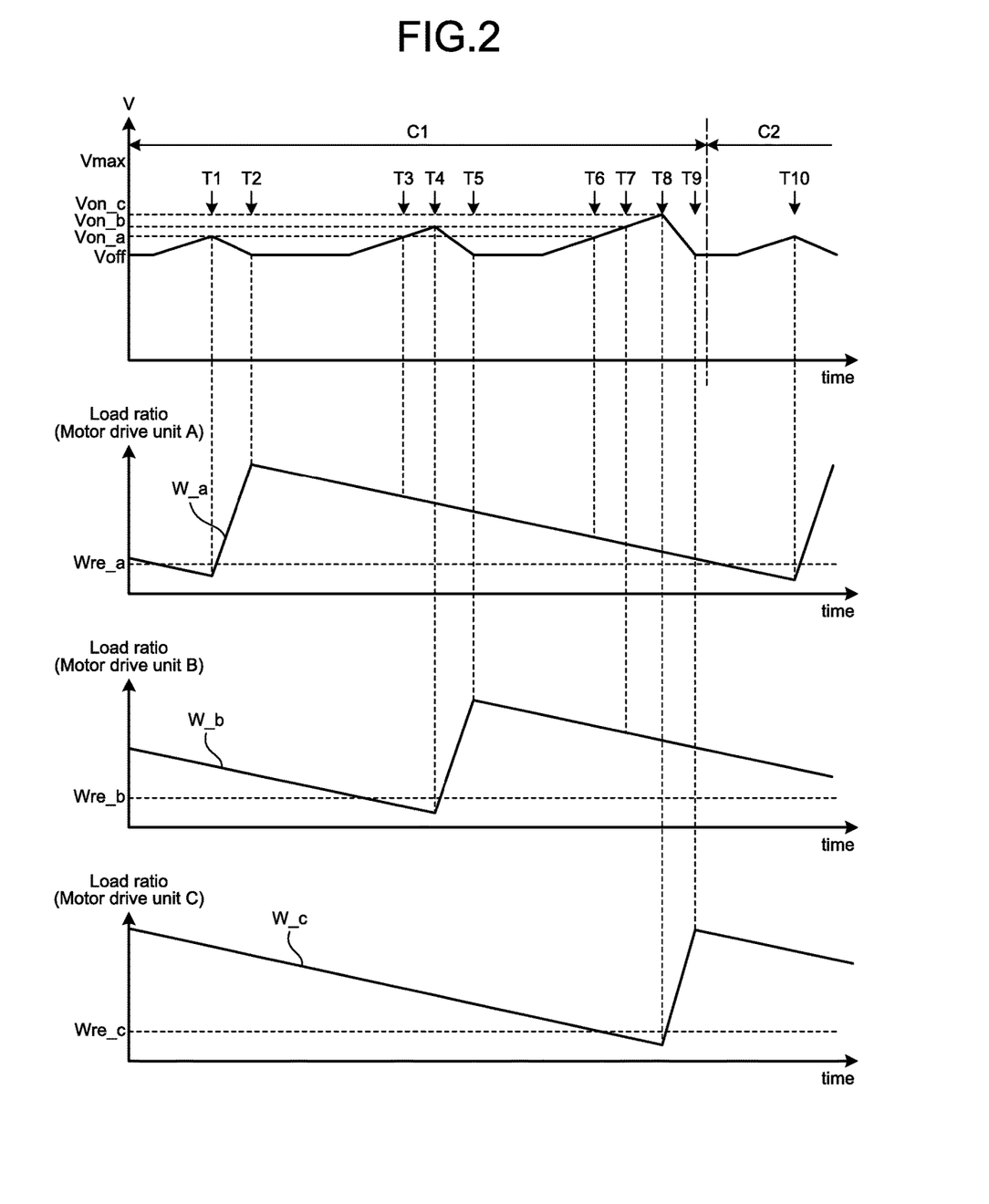
FIG. 2 is a timing chart illustrating time relations between a bus voltage and regenerative load ratios of motor drive devices, in an operational pattern in which a regenerative control needs to be executed multiple times during an operation of a system.

FIG. 2 is a timing chart illustrating time relations between a bus voltage and regenerative load ratios of the motor drive devices, in an operational pattern in which a regenerative control needs to be executed multiple times during an operation of a system. The timing chart illustrated at the top of FIG. 2 is a diagram of the relation of the bus voltage with respect to a time. The vertical axis represents a voltage, while the horizontal axis represents a time. The timing charts illustrated below the top chart in FIG. 2 show the relations between regenerative load ratios of the motor drive devices and a time. The vertical axis represents a load ratio, while the horizontal axis represents a time. The regenerative-control start voltages for the motor drive devices 50A, 50B, and 50C are represented as Von_a, Von_b, and Von_c, respectively. In this example, the regenerative-control start voltages are set to have a relation Von_a<Von_b<Von_c<Vmax. Vmax in FIG. 2 represents a value of the maximum allowable bus voltage for the system. Each of C1 and C2 in FIG. 2 represents one operating cycle in the system.

First, when the bus voltage is increased by the first regenerative control, this bus voltage exceeds the value of Von_a. Therefore, the motor drive device 50A starts a regenerative control (T1 in FIG. 2). Upon the start of the regenerative control, a regenerative load ratio W_a in the motor drive device 50A is increased as illustrated immediately below the top chart in FIG. 2. The bus voltage starts decreasing. Further, the bus voltage is decreased to a regenerative-control stop voltage Voff due to continuation of the regenerative control. The regenerative control in the motor drive device 50A is stopped, and therefore the regenerative load ratio W_a starts decreasing (T2 in FIG. 2).

Next, the bus voltage is increased by the second regenerative control. Therefore, the bus voltage becomes a value of the regenerative-control start voltage Von_a (T3 in FIG. 2). However, at this time, the regenerative load ratio W_a in the motor drive device 50A is not lower than a regeneration-capable load ratio Wre_a. Accordingly, the motor drive device 50A does not start a regenerative control. Consequently, the regenerative load ratio W_a continues to further decrease. Meanwhile, the bus voltage is increased and exceeds the regenerative-control start voltage Von_a.

After the bus voltage is increased and exceeds Von_a, this bus voltage reaches a voltage that exceeds the regenerative-control start voltage Von_b. Therefore, the motor drive device 50B starts a regenerative control (T4 in FIG. 2). Under the regenerative control in the motor drive device 50B, a regenerative load ratio W_b in the motor drive device 50B is increased as illustrated immediately above the bottom chart in FIG. 2. The bus voltage starts decreasing. The bus voltage is decreased to the regenerative-control stop voltage Voff, and then the regenerative control in the motor drive device 50B is stopped. Therefore, the regenerative load ratio W_b starts decreasing (T5 in FIG. 2).

A case is further considered, in which the bus voltage starts increasing by the third regenerative control. First, the bus voltage becomes a value of the regenerative-control start voltage Von_a. Because the regenerative load ratio W_a in the motor drive device 50A is not lower than the regeneration-capable load ratio Wre_a, the motor drive device 50A does not start a regenerative control. Therefore, the regenerative load ratio W_a continues to further decrease. Meanwhile, the bus voltage is increased and exceeds the regenerative-control start voltage Von_a (T6 in FIG. 2).

The bus voltage soon becomes a value of the regenerative-control start voltage Von_b. The regenerative load ratio W_b in the motor drive device 50B is higher than a regeneration-capable load ratio Wre_b, and therefore the motor drive device 50B does not start a regenerative control. Accordingly, the regenerative load ratio W_b continues to further decrease. Meanwhile, the bus voltage is increased and exceeds the regenerative-control start voltage Von_b (T7 in FIG. 2).

After the bus voltage is increased and exceeds the regenerative-control start voltage Von_b, this bus voltage exceeds Von_c. Consequently, the motor drive device 50C starts a regenerative control (T8 in FIG. 2). Upon the start of the regenerative control, a regenerative load ratio W_c in the motor drive device 50C is increased as illustrated in the bottom chart in FIG. 2. The bus voltage starts decreasing. The bus voltage is decreased to the regenerative-control stop voltage Voff, and then the regenerative control in the motor drive device 50C is stopped. Therefore, the regenerative load ratio W_c starts decreasing (T9 in FIG. 2).

One cycle of regenerative control of the motor operation is completed through a series of steps of the regenerative control described above. When the cycle of the motor operation is shifted to the next cycle C2, the regenerative load ratio in the motor drive device 50A becomes lower than the regeneration-capable load ratio Wre_a after a sufficient time has elapsed. Therefore, the regenerative control described above is repeated afterwards. That is, controls to enable or disable the regenerative control are switched for each individual motor drive device, and accordingly the regenerative control is executed.

Figure 3:
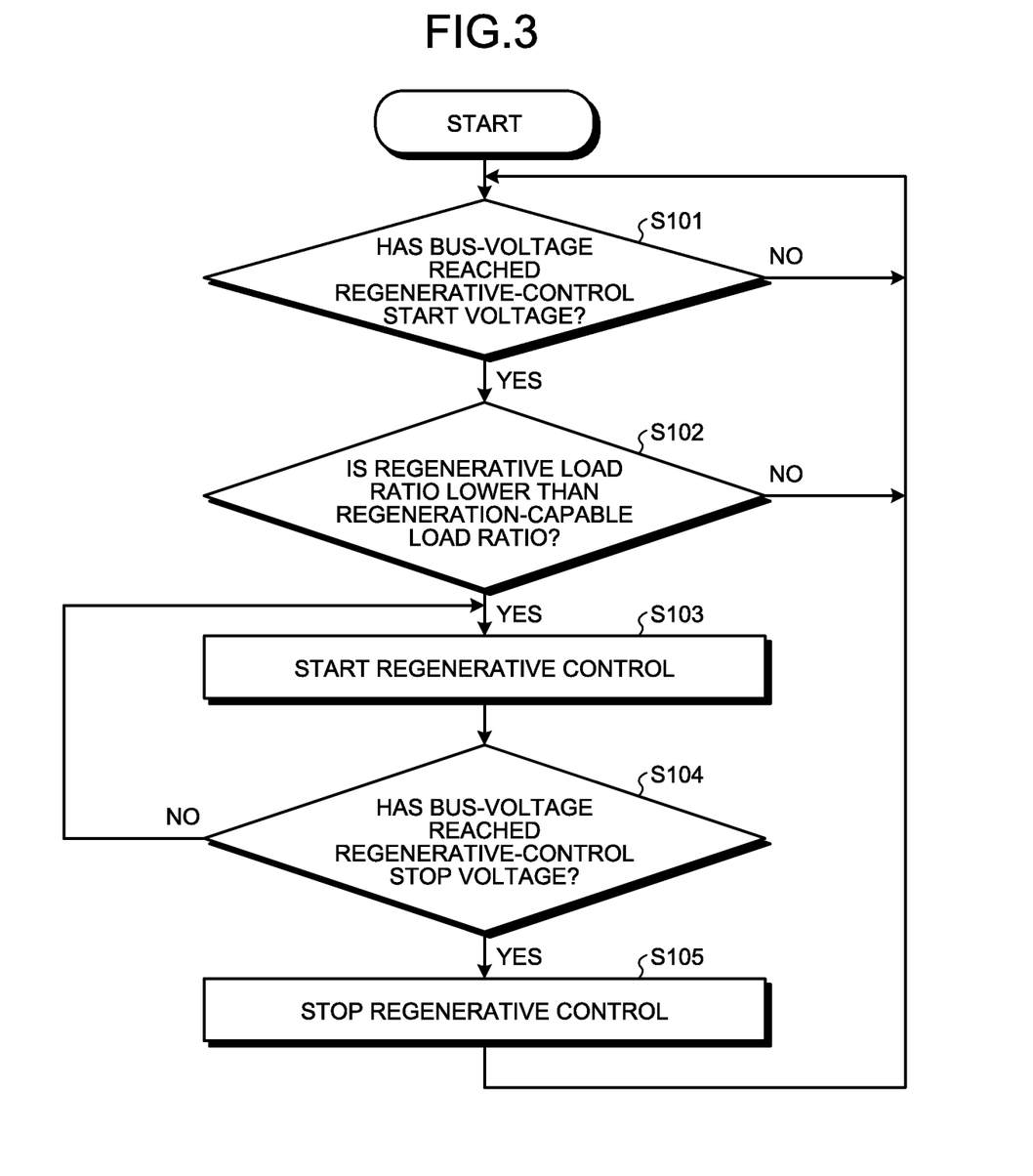
FIG. 3 is a flowchart of an operation illustrated in FIG. 2, which focuses on a single motor drive device.

FIG. 3 is a flowchart of a series of steps of the regenerative control described above, which focuses on a single motor drive device. First, at Step S101, whether the bus voltage has reached the regenerative-control start voltage is determined. If the bus voltage has not reached the regenerative-control start voltage (NO at Step S101), the process at Step S101 is repeated. If the bus voltage has reached the regenerative-control start voltage (YES at Step S101), the process flow shifts to Step S102. At Step S102, whether the regenerative load ratio is lower than the regeneration-capable load ratio is determined. If the regenerative load ratio is equal to or higher than the regeneration-capable load ratio (NO at Step S102), the process flow returns to Step S101 to repeat the processes at Step S101 and Step S102. In contrast, if the regenerative load ratio is lower than the regeneration-capable load ratio (YES at Step S102), the motor drive device starts a regenerative control (Step S103). Next, at Step S104, whether the bus voltage has reached the regenerative-control stop voltage is determined. If the bus voltage has not reached the regenerative-control stop voltage (NO at Step S104), the process flow returns to Step S103 to repeat the processes at Step S103 and Step S104. In contrast, if the bus voltage has reached the regenerative-control stop voltage (YES at Step S104), the motor drive device stops the regenerative control (Step S105), and then repeats the processes from Step S101.

In the above determination process at Step S101, where the bus voltage is equal to the regenerative-control start voltage, it is determined as "YES". However, it is possible that this is determined as "NO". That is, it is possible that where the bus voltage is equal to the regenerative-control start voltage, it is determined as either "YES" or "NO".

In the above determination process at Step S102, where the regenerative load ratio is equal to the regeneration-capable load ratio, it is determined as "NO". However, it is possible that this is determined as "YES". That is, it is possible that where the regenerative load ratio is equal to the regeneration-capable load ratio, it is determined as either "YES" or "NO".

In the above determination process at Step S104, where the bus voltage is equal to the regenerative-control stop voltage, it is determined as "YES". However, it is possible that this is determined as "NO". That is, it is possible that where the bus voltage is equal to the regenerative-control stop voltage, it is determined as either "YES" or "NO".

As described above, the motor drive device according to the present embodiment has a regenerative function of consuming regenerative power, and also has a function of switching its own regenerative control between enabled and disabled depending on the value of a regenerative load ratio. It is sufficient that the regenerative function in each motor drive device can be designed to be active or inactive in accordance with a command to each motor drive device. Therefore, each individual motor drive device performs the operation illustrated in the flowchart in FIG. 3 described above. The operation illustrated in the timing charts in FIG. 2 is thereby achieved. This makes it possible for a plurality of motor drive devices to consume a large amount of regenerative power, which cannot be consumed only by the regenerative function in a single motor drive device, without synchronizing the regenerative control between the motor drive devices. Accordingly, a PN-busbar common system can be obtained, which does not need to construct the network management firmware that executes a regenerative control. Further, a PN-busbar common system can be obtained, which does not need a more advanced motor drive device having a master controller or a master function for managing the regenerative capability.

Figure 4:
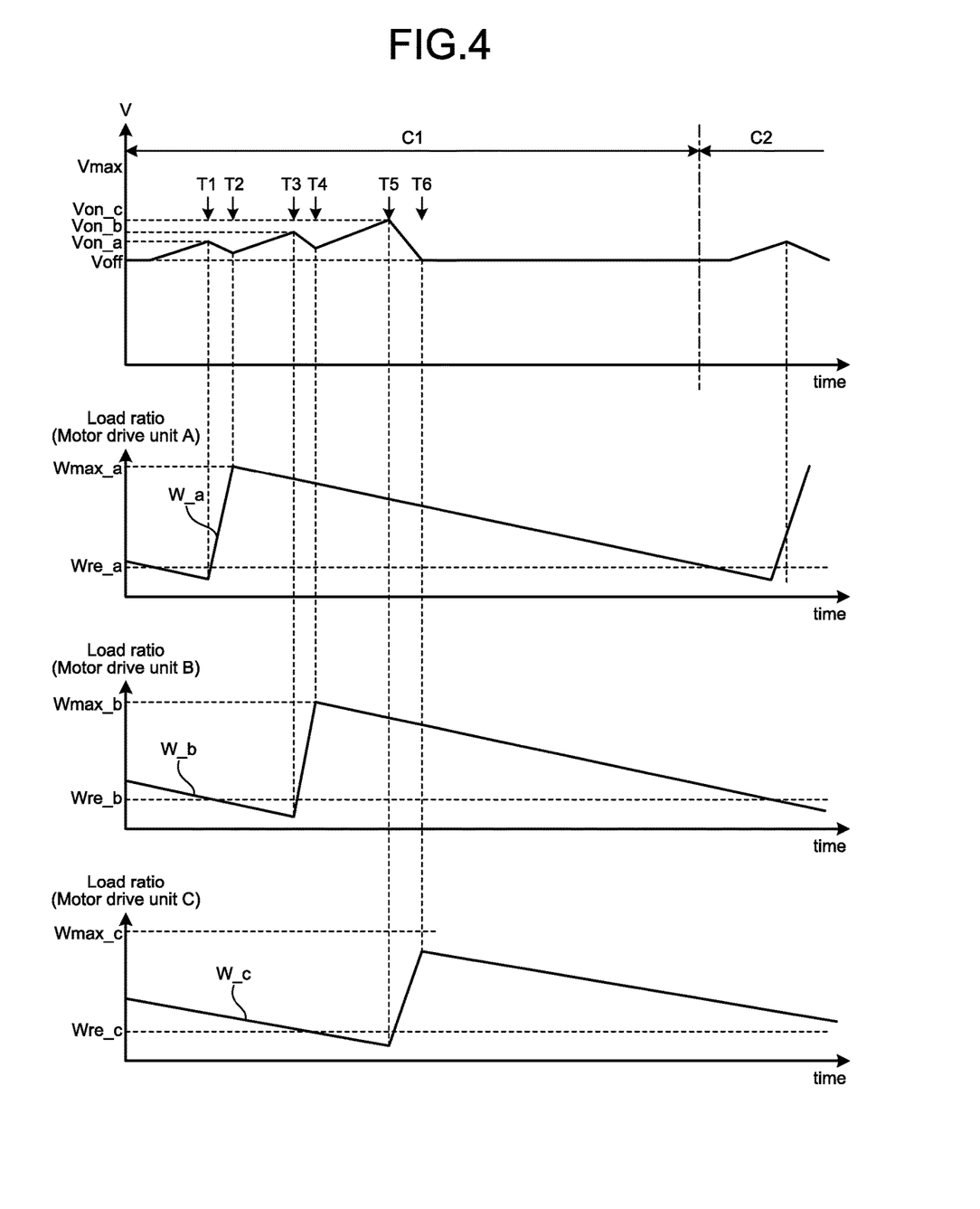
FIG. 4 is a timing chart when regenerative power generated once during each operating cycle of a system is consumed by a regenerative function in a plurality of motor drive devices.

FIG. 4 is a timing chart when regenerative power generated once during each operating cycle of a system is consumed by regenerative functions of a plurality of motor drive devices. The timing chart illustrated at the top of FIG. 4 is a diagram of the relation of the bus voltage with respect to a time. The vertical axis represents a voltage, while the horizontal axis represents a time. The timing charts illustrated below the top chart in FIG. 4 show the relations between regenerative load ratios of motor drive devices and a time. The vertical axis represents a load ratio, while the horizontal axis represents a time. The regenerative-control start voltage for the motor drive devices 50A, 50B, and 50C is represented as Von_a, Von_b, and Von_c, respectively. In this example, the regenerative-control start voltages are set to have a relation of Von_a<Von_b<Von_c<Vmax. Vmax in FIG. 4 represents a value of the maximum allowable bus voltage for the system. Wmax_a, Wmax_b, and Wmax_c in FIG. 4 represent allowable regenerative load ratios for the motor drive devices. Each of C1 and C2 in FIG. 4 represents one operating cycle in the system. It is common that the allowable regenerative load ratio is determined on the basis of the specifications of the motor drive device. However, it is possible that the allowable regenerative load ratio is set at an arbitrary value.

First, it is assumed that regenerative power is generated during the operation of the system, and the bus voltage reaches the regenerative-control start voltage Von_a for the motor drive device 50A (T1 in FIG. 4). Because the regenerative load ratio is lower than the regeneration-capable load ratio Wre_a, the motor drive device 50A starts a regenerative control. However, the regenerative load ratio reaches the maximum allowable load ratio Wmax_a before the bus voltage reaches the regenerative-control stop voltage Voff. Therefore, the motor drive device 50A stops the regenerative control (T2 in FIG. 4).

Because the motor drive device 50A stops the regenerative control, the bus voltage starts increasing again, and reaches the regenerative-control start voltage Von_b (T3 in FIG. 4). At this time, the motor drive device 50B starts a regenerative control. However, the regenerative load ratio reaches the maximum allowable load ratio Wmax_b before the bus voltage reaches the regenerative-control stop voltage Voff. Therefore, the motor drive device 50B stops the regenerative control (T4 in FIG. 4).

Because the motor drive device 50B stops the regenerative control, the bus voltage starts increasing again, and reaches the regenerative-control start voltage Von_c (T5 in FIG. 4). At this time, the motor drive device 50C starts a regenerative control. The bus voltage reaches the regenerative-control stop voltage Voff before the regenerative load ratio reaches the maximum allowable load ratio Wmax_c. Therefore, the motor drive device 50C stops the regenerative control (T6 in FIG. 4). Thereafter, the regenerative control described above is repeated. That is, controls to enable or disable the regenerative control are switched in each individual motor drive device, and accordingly the regenerative control is executed.

In the above descriptions, the case in which the regenerative functions operate individually has been explained. However, it is also possible that the regenerative-control start voltage and the regeneration-capable load ratio in each regenerative control unit 8 are set at a value such that a plurality of regenerative-power consumption circuits 5 operate simultaneously. It is possible to identify the regenerative power generated in each motor 10 and the timing at which a regenerative control is executed on each motor 10, on the basis of the operational pattern of each motor 10. It is also possible to calculate the timing at which the regenerative control can be restarted in each regenerative-power consumption circuit 5 on the basis of the regenerative power and the regenerative-control start timing. Therefore, the regenerative-control start voltage and the regeneration-capable load ratio in each regenerative control unit 8 are set so as to satisfy the conditions. This can handle an arbitrary regenerative control type.

Figure 5:
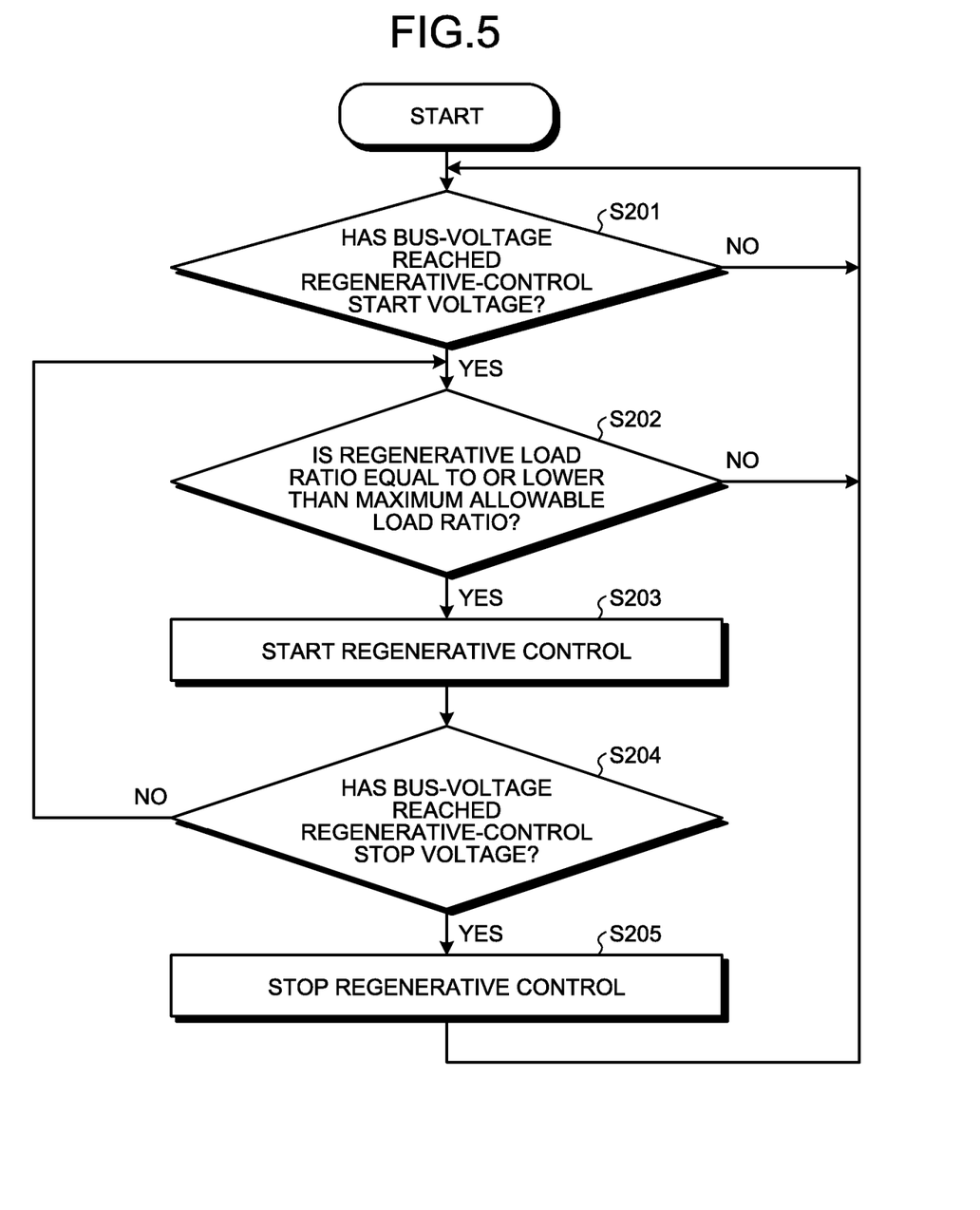
FIG. 5 is a flowchart of an operation illustrated in FIG. 4, which focuses on a single motor drive device.

FIG. 5 is a flowchart of a series of steps of the regenerative control described above, which focuses on a single motor drive device. First, at Step S201, whether the bus voltage has reached the regenerative-control start voltage is determined. If the bus voltage has not reached the regenerative-control start voltage (NO at Step S201), the process at Step S201 is repeated. If the bus voltage has reached the regenerative-control start voltage (YES at Step S201), the process flow shifts to Step S202. At Step S202, whether the regenerative load ratio is equal to or lower than the maximum allowable load ratio is determined. If the regenerative load ratio exceeds the maximum allowable load ratio (NO at Step S202), the process flow returns to Step S201 to repeat the determination processes at Step S201 and Step S202. In contrast, if the regenerative load ratio is equal to or lower than the maximum allowable load ratio (YES at Step S202), the motor drive device starts a regenerative control (Step S203). Next, at Step S204, whether the bus voltage has reached the regenerative-control stop voltage is determined. If the bus voltage has not reached the regenerative-control stop voltage (NO at Step S204), the process flow returns to Step S202 to repeat the processes at Step S202 and Step S203. In contrast, if the bus voltage has reached the regenerative-control stop voltage (YES at Step S204), the motor drive device stops the regenerative control (Step S205), and then repeats the process from Step S201.

In the above determination process at Step S201, where the bus voltage is equal to the regenerative-control start voltage, it is determined as "YES". However, it is possible that this is determined as "NO". That is, it is possible that where the bus voltage is equal to the regenerative-control start voltage, it is determined as either "YES" or "NO".

In the above determination process at Step S202, where the regenerative load ratio is equal to the maximum allowable load ratio, it is determined as "YES". However, it is possible that this is determined as "NO". That is, it is possible that where the regenerative load ratio is equal to the maximum allowable load ratio, it is determined as either "YES" or "NO".

In the above determination process at Step S204, where the bus voltage is equal to the regenerative-control stop voltage, it is determined as "YES". However, it is possible that this is determined as "NO". That is, it is possible that where the bus voltage is equal to the regenerative-control stop voltage, it is determined as either "YES" or "NO".

As described above, the motor drive device according to the present embodiment has a regenerative function of consuming regenerative power, and also has a function of switching its own regenerative control between enabled and disabled depending on the value of regenerative load ratio. It is sufficient that the regenerative function in each motor drive device can be at least designed to be active or inactive in accordance with a command to each motor drive device. Therefore, each individual motor drive device performs the operation illustrated in the flowchart in FIG. 5 described above. The operation illustrated in the timing charts in FIG. 4 is thereby achieved. This makes it possible for a plurality of motor drive devices to consume a large amount of regenerative power, which cannot be consumed only by the regenerative function in a single motor drive device, without synchronizing the regenerative control between the motor drive devices. Accordingly, a PN-busbar common system can be obtained, which does not need to construct the network management firmware that executes a regenerative control. Further, a PN-busbar common system can be obtained, which does not need a more advanced motor drive device having a master controller or a master function for managing the regenerative capability.

In the present embodiment, the case has been described, in which the number of motor drive devices to be located within the PN-busbar common system, more specifically, the number of motor drive devices having a regenerative function, is three. However, the number of motor drive devices having a regenerative function is not limited thereto. The important point is to obtain a regenerative capability in the entire system, which is great enough to consume the regenerative power calculated from the specifications of the motor output from each motor located within the PN-busbar common system, and from the operational pattern of each motor. The number of motors does not necessarily need to correspond with the number of motor drive devices having a regenerative function.

In the descriptions of FIG. 2 to FIG. 5, whether to start the regenerative control, and whether to stop the regenerative control are determined by using different determination values. It is also possible that an identical determination value is used. That is, it is possible that when the bus voltage becomes equal to or higher than a regenerative-control start voltage, it is determined to start the regenerative control, and when the bus voltage becomes lower than the regenerative-control start voltage, it is determined to stop the regenerative control.

In the descriptions of FIG. 2 and FIG. 4, whether to restart the regenerative control is determined on the basis of the regeneration-capable load ratio. It is also possible that, instead of the regeneration-capable load ratio, whether to restart the regenerative control is determined on the basis of the elapsed time since the applicable motor control device has stopped the regenerative control. That is, even though the bus voltage has reached the regenerative-control start voltage in a certain motor control device, when a sufficient time has not yet elapsed, this motor control device does not restart the regenerative control. In contrast, when a sufficient time has elapsed, this motor control device restarts the regenerative control.

Figure 6:
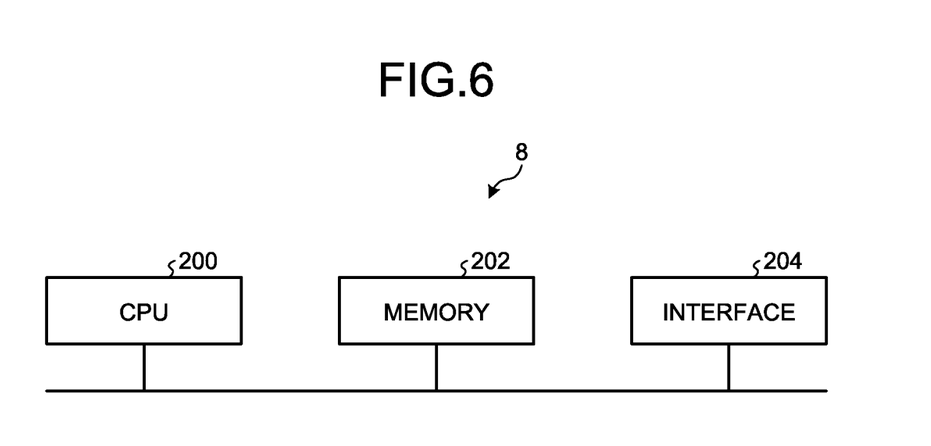
FIG. 6 is a block diagram illustrating an example of a hardware configuration according a regenerative control unit of the embodiment.

Lastly, with reference to FIG. 6, there is described below a hardware configuration of the regenerative control unit 8 according to the present embodiment when the functions of the regenerative control unit 8 are implemented by software. In the case where the functions of the regenerative control unit 8 are implemented by software, the regenerative control unit 8 can be configured to include a CPU (Central Processing Unit) 200 that performs computation, a memory 202 that stores therein a program to be read by the CPU 200, and an interface 204 that inputs and outputs a signal, as illustrated in FIG. 6. It is also possible that the CPU 200 is a device referred to as a "computation device", a "microprocessor", a "microcomputer", a "processor", a "DSP (Digital Signal Processor)", or the like. The memory 202 is, for example, a nonvolatile or volatile semiconductor memory, such as a RAM (Random Access Memory), a ROM (Read Only Memory), a flash memory, an EPROM (Erasable Programmable ROM), or an EEPROM (Electrically EPROM).

Specifically, the memory 202 has stored therein a program that executes various types of control function, and information related to the specifications of the motor output, and related to the regenerative capability of each motor drive device. The CPU 200 transmits and receives necessary information through the interface 204, thereby executing various types of computation process and control process, which have been described in the present embodiment. The various types of computation process described herein refer to a process of computing the allowable regenerative power, the regenerative load ratio, the regenerative-control start voltage, the regenerative-control stop voltage, the regeneration-capable load ratio, and the maximum allowable load ratio. The various types of control process described herein refer to a process of generating a drive signal for driving the switch 5b of the regenerative-power consumption circuit 5 on the basis of the results of the computation of the allowable regenerative power, the regenerative load ratio, the regenerative-control start voltage, the regenerative-control stop voltage, the regeneration-capable load ratio, and the maximum allowable load ratio. The various types of control process also refer to a timing process for outputting the generated drive signal to the drive circuit 7. The results of the various types of computation process executed by the CPU 200 are stored in the memory 202.

Figure 7:
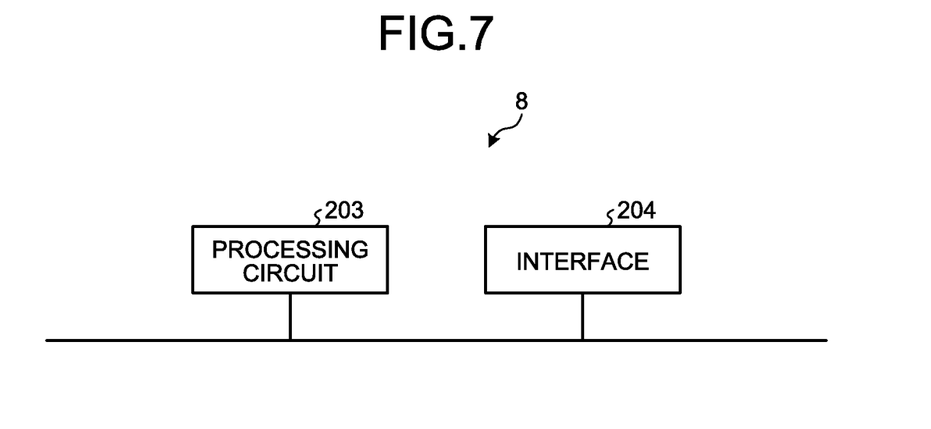
FIG. 7 is a block diagram illustrating another example of the hardware configuration according the regenerative control unit of the embodiment.

It is also possible that the CPU 200 and the memory 202 illustrated in FIG. 6 are replaced with a processing circuit 203 as illustrated in FIG. 7. For example, the processing circuit 203 is a single circuit, a combined circuit, a programmed processor, a parallel-programmed processor, an ASIC (Application Specific Integrated Circuit), an FPGA (Field Programmable Gate Array), or a combination thereof.

In the present embodiment, the example has been described, in which the regenerative control unit 8 is constructed inside the motor drive device 50. It is also possible that the regenerative control unit 8 is constructed outside the motor drive device 50 to serve as a regenerative control device. In that case, it is possible that the regenerative control unit 8 receives necessary information for the control from the motor drive device 50 and other constituent units through the interface 204.

The configurations described in the above embodiment are only examples of the content of the present invention. The configurations can be combined with other well-known techniques, and a part of each configuration can be omitted or modified without departing from the scope of the present invention.

REFERENCE SIGNS LIST

1 AC power supply, 2 converter circuit, 3 diode stack, 4 main circuit capacitor, 5 regenerative-power consumption circuit, 5a regenerative resistor, 5b switch, 6 inverter circuit, 7 drive circuit, 8 regenerative control unit, 9 PN-busbar, 9a P-busbar, 9b N-busbar, 10 (10A, 10B, 10C) motor, 50 (50A, 50B, 50C) motor drive device, 100 PN-busbar common system, 200 CPU, 202 memory, 203 processing circuit, 204 interface.

The invention claimed is:

1. A regenerative control method that is applied to a PN-busbar common system to control a voltage in a common PN-busbar so as to suppress a voltage increase, where in the PN busbar common system, a plurality of motor drive devices are provided correspondingly to a plurality of motors, each of which is supplied with power from the PN-busbar, and the motor drive devices individually drive the corresponding motors, the regenerative control method comprising:
a first step of determining whether a bus voltage generated in the PN-busbar has reached a regenerative-control start voltage;
a second step of determining whether a regenerative load ratio is lower than a regeneration-capable load ratio that is a determination value used to determine whether the regenerative control is restarted, if the bus voltage has reached the regenerative-control start voltage at the first step;
a third step of starting a regenerative control if the regenerative load ratio is lower than the regeneration-capable load ratio at the second step;
a fourth step of determining whether the bus voltage has reached a regenerative-control stop voltage if the regenerative control is started at the third step; and
a fifth step of stopping the regenerative control if the bus voltage has reached the regenerative-control stop voltage at the fourth step.

2. The regenerative control method according to claim 1, further comprising a sixth step of stopping the regenerative control if the regenerative load ratio exceeds a maximum allowable load ratio and the bus voltage has not reached the regenerative-control stop voltage at the fourth step.

3. A regenerative control method that is applied to a PN-busbar common system to control a voltage in a common PN-busbar so as to suppress a voltage increase, where in the PN busbar common system, a plurality of motor drive devices are provided correspondingly to a plurality of motors, each of which is supplied with power from the PN-busbar, and the motor drive devices individually drive the corresponding motors, the regenerative control method comprising:
a first step of determining whether a bus voltage generated in the PN-busbar has reached a regenerative-control start voltage;
a second step of determining whether a regenerative load ratio is lower than a maximum allowable load ratio that is a determination value used to determine whether the calculated regenerative load ratio has reached an allowable regenerative capability, if the bus voltage has reached the regenerative-control start voltage at the first step;
a third step of starting a regenerative control if the regenerative load ratio is lower than the maximum allowable load ratio at the second step;
a fourth step of determining whether the bus voltage has reached a regenerative-control stop voltage if the regenerative control is started at the third step; and
a fifth step of stopping the regenerative control if the bus voltage has reached the regenerative-control stop voltage at the fourth step.

* * * * *